US010821478B2

(12) United States Patent
Delfer

(10) Patent No.: US 10,821,478 B2
(45) Date of Patent: Nov. 3, 2020

(54) INFORMATION-PROTECTED WINDOW SEND ENVELOPE WITH ADHERED INSIDE ADDRESS PATCH

(71) Applicant: Broadridge Customer Communications, LLC, Jersey City, NJ (US)

(72) Inventor: Frank W. Delfer, Incline Village, NV (US)

(73) Assignee: Broadridge Customer Communications, LLC, Jersey City, NJ (US)

(*) Notice: Subject to any disclaimer, the term of this patent is extended or adjusted under 35 U.S.C. 154(b) by 0 days.

(21) Appl. No.: 16/572,021

(22) Filed: Sep. 16, 2019

(65) Prior Publication Data

US 2020/0009617 A1 Jan. 9, 2020

Related U.S. Application Data

(63) Continuation of application No. 16/046,802, filed on Jul. 26, 2018, now abandoned, which is a continuation of application No. 15/694,121, filed on Sep. 1, 2017, now abandoned, which is a continuation of application No. 15/239,251, filed on Aug. 17, 2016, now Pat. No. 9,751,112.

(Continued)

(51) Int. Cl.

| | |
|---|---|
| ***G06F 17/00*** | (2019.01) |
| ***B07C 3/20*** | (2006.01) |
| ***B07C 3/18*** | (2006.01) |
| ***B42D 15/08*** | (2006.01) |
| ***B42D 15/00*** | (2006.01) |
| ***B65D 27/04*** | (2006.01) |

(52) U.S. Cl.

CPC .................. *B07C 3/20* (2013.01); *B07C 3/18* (2013.01); *B42D 15/0053* (2013.01); *B42D 15/08* (2013.01); *B65D 27/04* (2013.01)

(58) Field of Classification Search

CPC ........ B65D 27/06; B65D 27/04; B65D 27/34; B65D 2203/06; B65D 27/14; B65D 27/16; G07B 17/00508; G07B 17/00661; G07B 2017/0058; G07B 2017/00588; G07B 2017/00596; G07B 2017/0062; G07B 2017/00637; G07B 2017/00725

See application file for complete search history.

(56) References Cited

U.S. PATENT DOCUMENTS

2004/0001133 A1* 1/2004 Critelli .................. B41M 3/144 347/101
2004/0112946 A1* 6/2004 Smythe .................. B43M 3/045 229/71

(Continued)

*Primary Examiner* — Thien M Le
(74) *Attorney, Agent, or Firm* — Greenberg Traurig, LLP

(57) ABSTRACT

Printed transactional documents are enclosed in a document size-inclusive envelope that gives the appearance of being a traditional windowed envelope in which the send address shows through from the address vehicle page inside, but actually has the address printed on an adhered patch that shows through the window, keeping the data inside more protected and allowing production processes to be more efficient, and the patch or envelope has a serialized identifier that ensures the address printed on the patch and seen in the window corresponds with the document on the inside.

18 Claims, 14 Drawing Sheets

Related U.S. Application Data

(60) Provisional application No. 62/207,207, filed on Aug. 19, 2015.

(56) References Cited

U.S. PATENT DOCUMENTS

| | | | | |
|---|---|---|---|---|
| 2005/0184140 | A1* | 8/2005 | DeLa Vergne | B65D 27/06 229/301 |
| 2007/0007341 | A1* | 1/2007 | Poulin | G07C 13/00 235/386 |
| 2008/0041928 | A1* | 2/2008 | DeLaVergne | B65D 27/04 229/301 |
| 2008/0074707 | A1* | 3/2008 | Cranitch | H04N 1/00209 358/403 |
| 2009/0212098 | A1* | 8/2009 | Stratton | B65D 27/06 229/301 |
| 2011/0029126 | A1* | 2/2011 | Van Gorp | B43M 3/04 700/220 |

* cited by examiner

INFORMATION-PROTECTED WINDOW SEND ENVELOPE WITH ADHERED INSIDE ADDRESS PATCH

CROSS-REFERENCE TO RELATED APPLICATIONS

This application claims priority to, and the benefit of, U.S. provisional patent application Ser. No. 62/207,207 filed on Aug. 19, 2015, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The subject invention pertains generally to the manner in which transactional documents, such as bills, statements, and the like, are enclosed in envelopes in order to be mailed to recipients via First Class US Mail. More specifically, the subject invention relates to a document size-inclusive window send envelope that appears to present an address through a cutout window that is printed on an inner document, but, in fact, is an internal document information-protected window send envelope that shows an opaque address patch adhered to the inside of the envelope that is specifically matched with the inside document(s).

2. Background Discussion

Transactional documents such as bills, statements, and the like often contain sensitive and timely financial and/or health care information about the recipient that the document's sender is responsible for protecting until it is in the recipient's hands. In recent years federal law has increased the penalties for service providers who fail to adequately protect such information.

This protection responsibility can be legally transferred to the US Postal Service (USPS) if the document is sent via First Class mail in a properly addressed envelope complying with applicable USPS standards. Mail pieces bearing delivery addresses in compliance with this standard enjoy the full protection of the U.S. Postal Inspection Service, the primary federal law enforcement and security arm of the USPS. Postal Inspectors protect customers and investigate criminals who fraudulently misuse the U.S. Mail to commit crime. Through its security and enforcement functions, the Postal Inspection Service provides assurance to postal customers that their mail will be delivered safely and securely.

The same protections are available from other domestic and international postal authorities, so the term "postal authority" refers to all domestic and international mail delivery services that provide a level of security substantially the same as that of the United States Postal Service.

To help ensure that documents are properly addressed, senders of First Class mail, long ago, mostly abandoned the idea of printing a recipient's mailing address on the outside of the envelope, opting instead to cut a hole or "window" through the envelope so that the address printed on the document inside showed through. This eliminates the risk of the address on the outside not matching the address on the document inside the envelope.

At the same time, senders of less-sensitive and less-timely information such as advertisements have mostly opted to send documents via Standard Class mail using envelopes that do have the recipient's address printed on the outside. In many cases the contents are the same for each recipient. The outside-printed address is an advantage for such mailers because it eliminates the need to mechanically align a send address printed on the document inside with the mailing envelope window.

There are various consequences of the current practices. Over time, mail recipients have become accustomed to, at a glance, considering the windowed envelope as an indicator of how important a particular mail piece is and whether it is personalized for the recipient or just a generic advertisement that can be discarded without being opened. Thus, the mere presence or absence of a send envelope window can play a valuable role in determining the degree of attention paid to the mail piece by the recipient and whether it will be opened, regardless of the envelope's actual contents. This makes First Class mailers extremely reluctant to abandon the use of windowed envelopes for fear the envelope will be discarded unopened.

At the same time, mergers and acquisitions in the financial, health care, and telecommunications industries and the consequent drive to reduce costs through consolidation has led to the need to make large numbers of document types with many different address locations and fold specifications share the same windowed envelope design so they can be processed in the same production run and mailed more efficiently.

However, these efforts have been stymied by several critical, competing factors. For example, the different locations of send addresses printed on the different types of documents pushes mailers to enlarge the envelope window so the same envelope can accommodate different send address locations, but the need to protect Personally Identifiable Information (PII) printed near the send address location from being viewed through the envelope window pushes mailers to shrink the envelope window to keep the PII data secure.

Further, mailers have an incentive to keep the envelope's size large so that high speed inserting equipment can run more efficiently, but this gives the document inside more room to move around, requiring the mailer again to increase the size of the window to accommodate the moving address, but once again only at the risk of exposing more PII data.

Mailers often address the above problems by adding an additional sheet to the document, a cover page whose purpose is solely to present the mailing address in a manner that is mechanically aligned with the envelope's window, which effectively protects all PII on the pages behind, sometimes called an Address Vehicle Page (AVP) (see FIG. 1—PRIOR ART).

One of the problems associated with this AVP method is the additional production cost of the extra sheet, which must be produced in line with the other sheets in the document, often during peak demand periods, plus the additional postage cost of the extra weight. In the case of international mailings, part of the postage cost is directly related to total package weight. With mailings typically numbering in the millions of mail pieces for a large scale mailing facility, every gram/ounce counts and these costs can create a substantial barrier to the method's use, often substantial enough to negate its utility. In addition, environmentally conscious recipients often complain to the sender that the AVP is a waste of paper and environmentally unsound.

Yet further, mailers have an incentive to use the same envelope for documents that consist of a small number of sheets, as those that have a large number of sheets, because they can be processed in the same production run and placed into the same mailing tray, substantially reducing postage costs. However, the large variance in the number of sheets from one document to the next impacts the alignment of the send address within the envelope window (see FIG. 2—PRIOR ART), which pushes the mailer to increase the size of the window, only to once again increase the risk of exposing more PII data.

Yet additionally, mailers have an incentive to use the same equipment and processes to insert the widest possible array of document types efficiently, but still end up with each document's send address properly aligned with the send envelope window. As seen in FIG. 3—PRIOR ART, this presents a complex variety of permutations, considering just the most common combinations of document folding habits, and send address locations (i.e. either at the top of the page or at the bottom of the page, whether the documents are presented to the inserting machine face up or face down, and whether the documents are fed into the equipment either head first or foot first).

BRIEF SUMMARY

An object of the technology described herein is to provide a mailing package, method of mailing, and system for creating postal authority-compliant mail pieces that have the same look and feel as windowed transactional mail pieces but are produced as efficiently as mail pieces with sprayed-on addresses and internal document information is protected from viewing through the window.

Another object of the technology described herein is to furnish a postal authority-compliant mail piece that includes a mailing document size-inclusive envelope having an internal information-protected cutout window, a document having associated address information for a recipient contained within the windowed envelope and a window patch printed with the address and unique ID bar code information correlated with the document and adhered inside the envelope over the window and visible through the window, thereby protecting internal document information from viewing through the window.

A further object of the technology described herein is to supply means for producing patch material, means for producing adhered patch envelopes, means for correlating address information associated with the document with the address patch or envelope, means for adhering an address patch to an envelope, means for printing the address patch, and means for verifying the address patch information matches the document's associated address information.

Still another object of the technology described herein is to disclose a mail piece assembly system for creating a postal authority-compliant transactional mail piece that has a windowed envelope with an internal adhered address patch that is visible through the window and an internal document with an associated address, comprising: a) means for producing window patch material for adhering over the window inside the envelope; b) means for producing the window-adhered address patch from the window patch material; c) means for applying a unique serialized identifier to either the envelope or the address patch; d) means for correlating document address information with either the address window patch or the envelope unique identifiers; e) means for inserting the document into the envelope; f) means for printing the address patch with the document's associated address and unique ID bar code information; and g) means for verifying that the document's associated address matches the printed patch or envelope identifiers.

Disclosed is a mailing method, system, and mailing package in which a printed transactional document(s) and optional mailable items are enclosed in a mail item size-inclusive envelope that gives the appearance of being a traditional windowed envelope in which the send address shows through from the address vehicle page inside, but actually has the address printed on an adhered patch that shows through the window, keeping the data inside more secure and allowing production processes to be more efficient, and the patch or envelope has a serialized identifier that ensures the address printed on the patch and seen in the window corresponds with the document on the inside.

More specifically, disclosed is a postal authority-compliant mail piece, comprising: a) a document size-inclusive mailing envelope having a cutout window; b) a document comprising one or more pages and having address information for a recipient contained within the windowed envelope; and c) a window patch printed with the address and unique ID bar code information associated with the document and adhered inside the envelope over the window and visible through the window, thereby protecting internal document information from viewing through the window. Also, included is a serialized barcode on the window patch to uniquely identify the envelope. Further, included is a process that correlates the window patch barcode with a unique identifier on the document. Additionally, included is a process that ensures that the address information on the document is printed on the window patch. Still further, included is a process that ensures that the address information printed on the window patch can be verified any time after being produced without opening the envelope. Yet included further is a process that ensures the verification without opening the envelope occurs by matching the document identifier with the window patch barcode to establish that they are correctly matched with each other. Also, included is a barcode on the envelope to uniquely identify the envelope, a process that matches the envelope barcode with a unique identifier on the document, a process that ensures that the address and unique ID bar code information associated with the document is printed on the envelope, a process that matches the envelope barcode with a unique identifier on the document, and a process that ensures the verification without opening the envelope occurs by matching the document identifier with the envelope barcode to establish that they are correctly matched with each other.

Additionally, disclosed is a method for mailing one or more identically or variably sized mailable items within an internal information-protected windowed size-inclusive send envelope. The internal information-protected windowed and mail item size-inclusive send envelope includes a cutout window and a window patch printed with the mail recipient's address and unique ID bar code information associated with an internal document and adhered inside the envelope over the window and visible through the window, thereby protecting internal information on the document from viewing through the window. Also, included is a serialized barcode on the window patch to uniquely identify the envelope. Further, included is a process that correlates the window patch barcode with a unique identifier on the document.

Also, disclosed is a mail piece assembly system for creating a postal authority-compliant transactional mail piece that has a windowed envelope with an internal adhered address patch that is visible through the window and an internal document with an associated address, comprising: a) means for producing window patch material for adhering over the window inside the envelope; b) means for producing the window-adhered address patch from the window patch material; c) means for applying a unique identifier to either the envelope or the address patch; d) means for correlating associated document address information with either the address window patch or the envelope unique identifiers; e) means for inserting the document into the envelope; f) means for printing the address patch with the address and unique ID bar code associated with the document; and g) means for verifying that the document address matches the printed patch or envelope identifiers.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 1—PRIORART—This figure shows a typical example of an "Address Vehicle Page" that is mailed within a standard window envelope (with or without an inner adhered see-through/clear cover patch) and that includes a unique ID bar code.

FIG. 2—PRIORART—Shows the problem of a shifting location of an address region when multiple pages are folded for insertion into an envelope.

FIG. 3—PRIORART—Shows the problem of a shifting location of an address region when multiple types of folding systems are utilized for folding documents for insertion into and envelope.

FIG. 4—PRIORART—Shows the outside of a traditional windowed envelope with an interior document having an address region including a unique ID bar code that shows through the window (with or without an inner adhered see-through/clear cover patch).

FIG. 5—PRIORART—Shows the inside of a traditional windowed envelope, that has not yet been folded, in which an inner see-through/clear cover patch in adhered to cover the window.

DETAILED DESCRIPTION

Referring more specifically to the drawings, for illustrative purposes the subject technology is embodied in the system generally shown in FIGS. 1 through 13B. It will be appreciated that the subject system, method, and mailing package may vary as to configuration and as to details of the components, and that the method of assembly may vary as to the specific steps and sequence, without departing from the basic concepts as disclosed herein.

Figure 1:
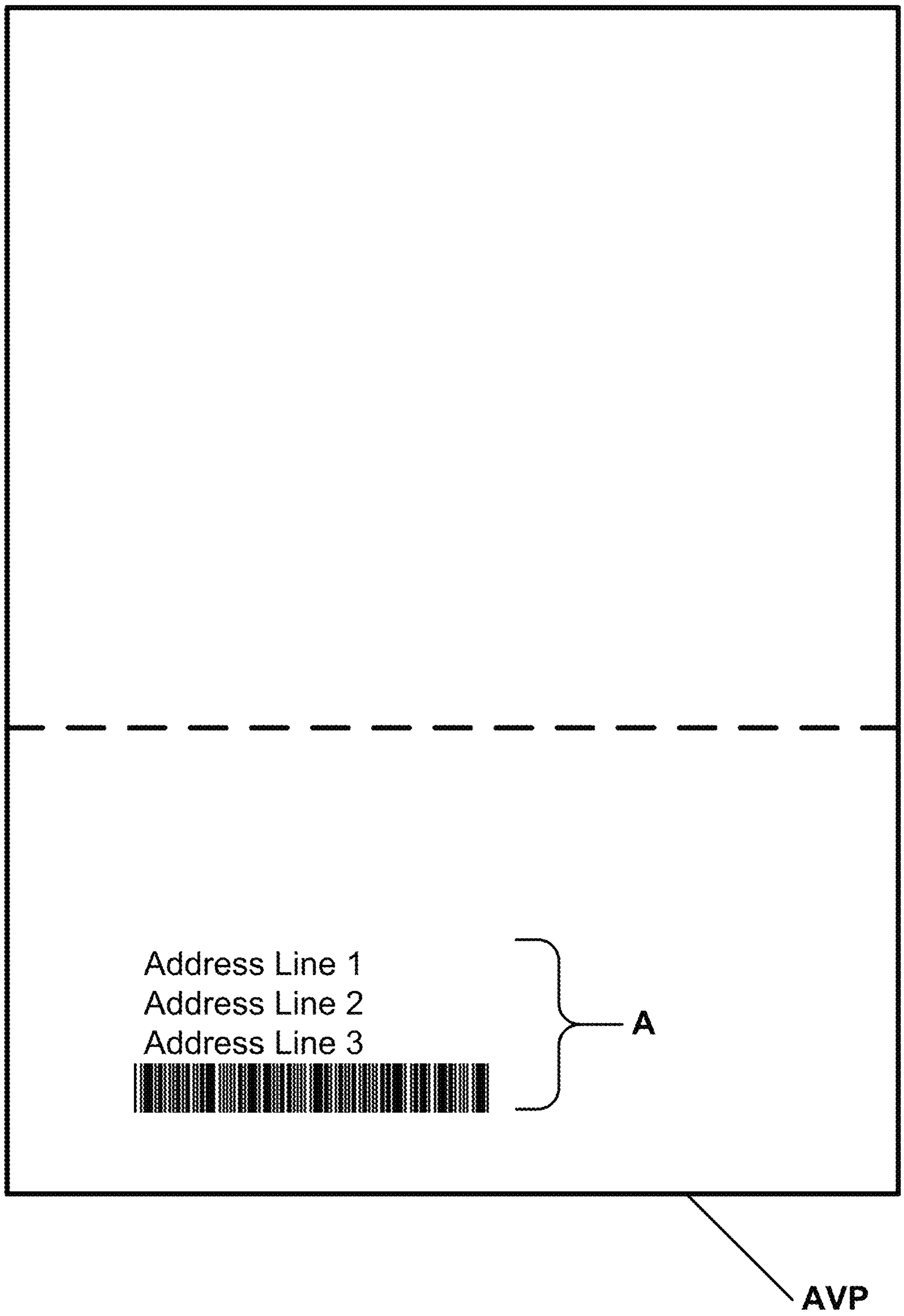
PRIOR ART FIG. 1
Figure 2:
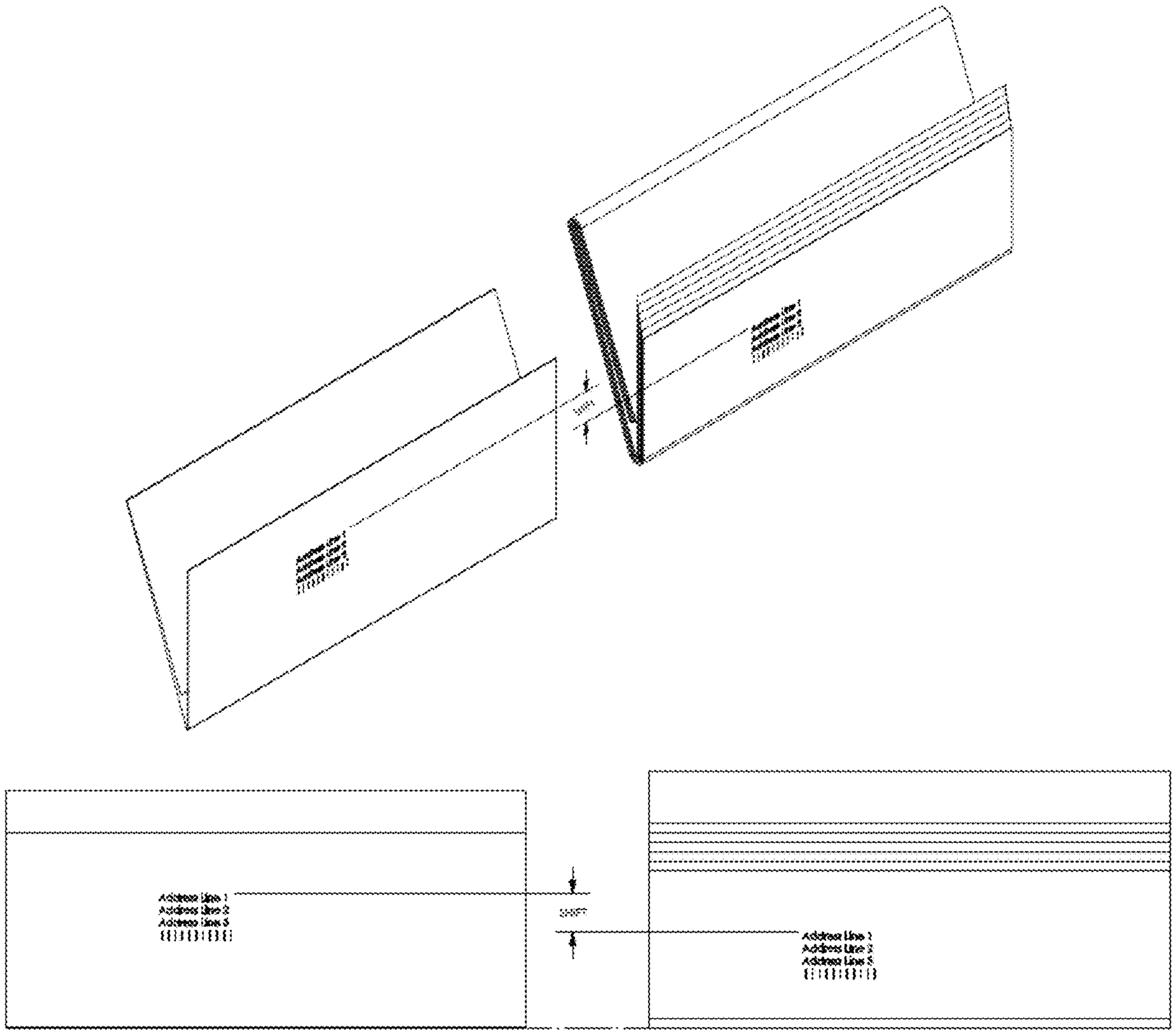
PRIOR ART FIG. 2
Figure 3:
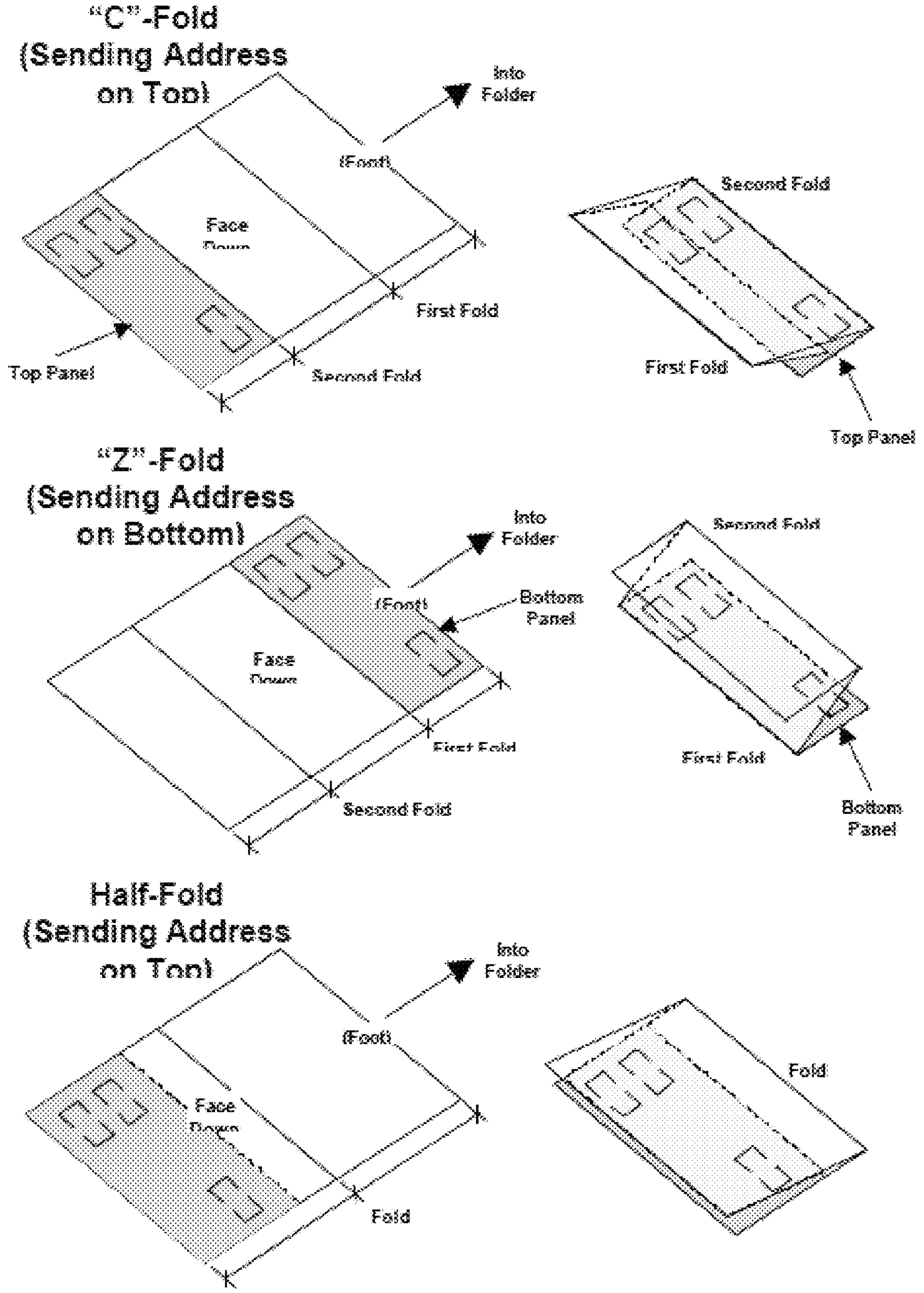
PRIOR ART FIG. 3
Figure 4:
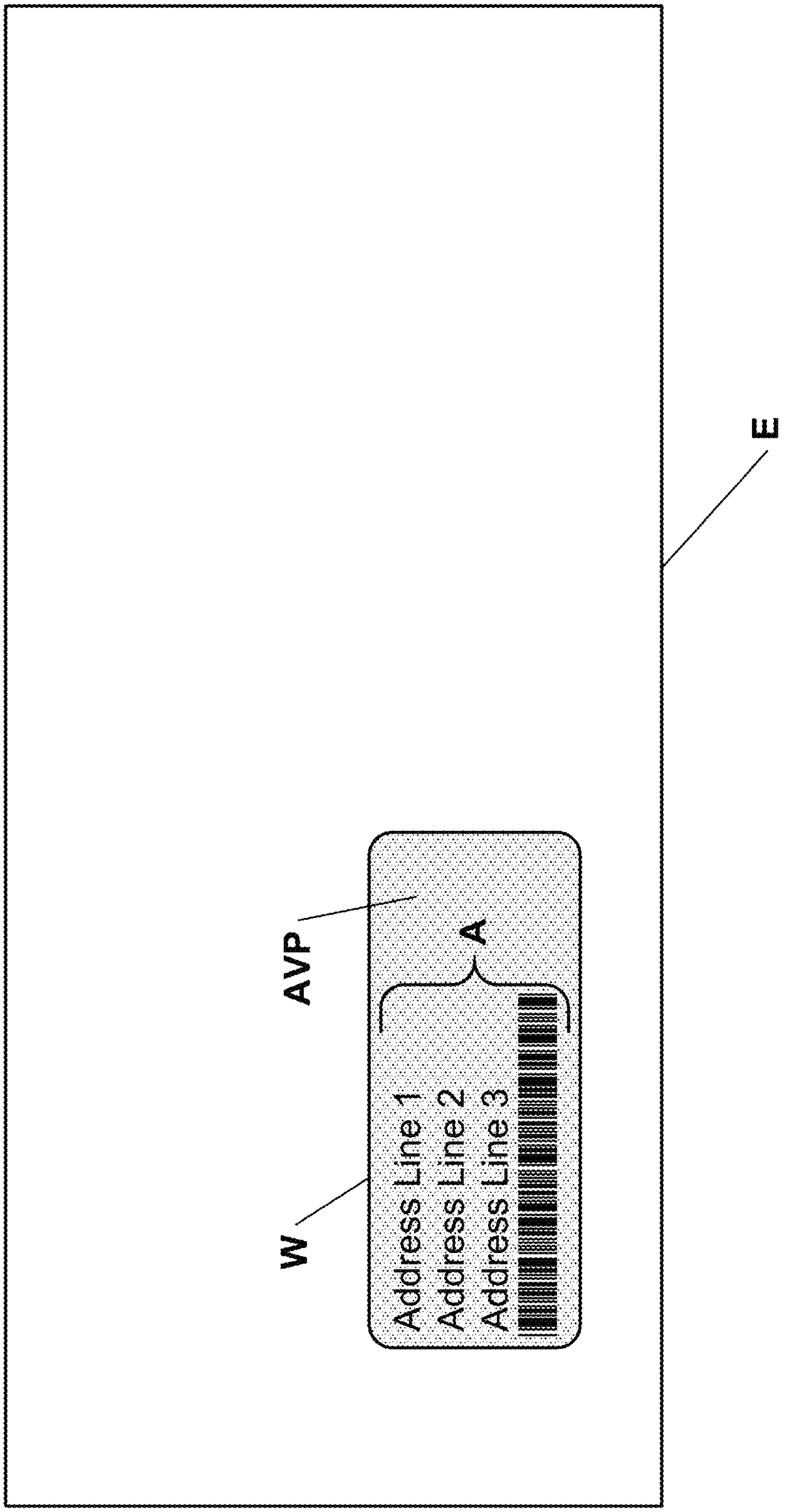
PRIOR ART FIG. 4
Figure 5:
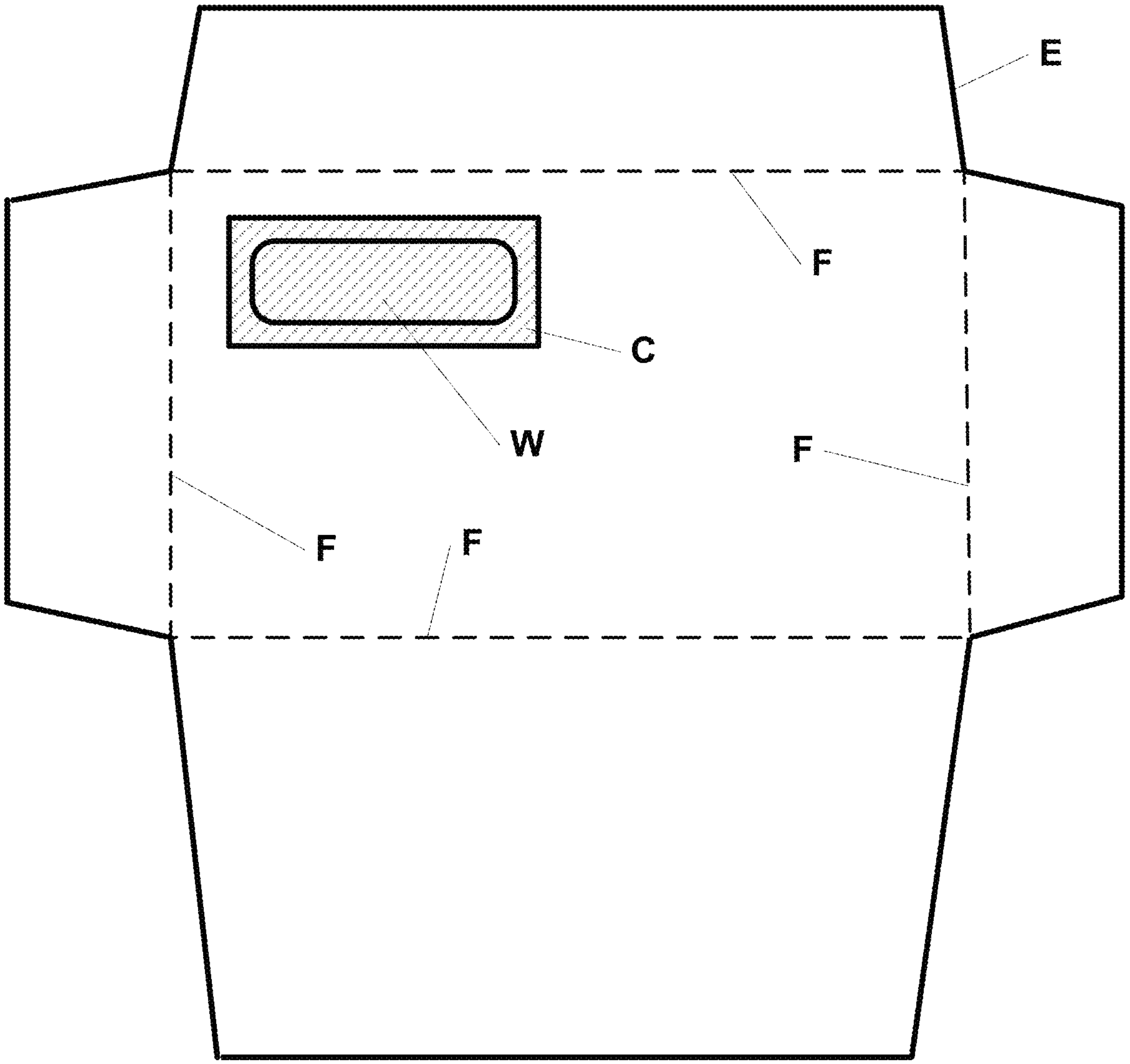
PRIOR ART FIG. 5

The subject invention solves existing problems in mailing documents in a windowed envelope, yet still presents the recipient with a mail piece that has the same look and feel of a traditional windowed envelope with a pre-printed address form inside (see FIG. 4—PRIOR ART). As seen in FIG. 4—PRIOR ART, the window W allows the address A printed on the AVP to show through (with or without a see-through/clear window material adhered to the inside of the window).

Transactional mail documents such as bills, statements, and the like are not only usually mailed inside windowed envelopes but are also often printed on forms that bear distinctive insignia or backgrounds (akin to watermarks or the equivalent). Service providers usually consider such artwork to be an important means of advertising their brand and typically have many years invested in presenting such imagery in a consistent fashion through many different channels so that customers recognize it instantly. Mail piece recipients therefore often consider both the presence of the windowed envelope and the artwork or insignia on the document visible through the window in deciding that such mail piece is indeed one that merits a higher level of attention.

The invention exploits this fact by replacing any see-through/clear window material used in some traditional windowed envelope manufacturing (see FIG. 5—PRIOR ART in its non-folded form, inside surface) with forms bearing the exact same distinctive insignia or background imagery that will be on the forms that ultimately travel to the recipient inside the very same envelope. As seen in FIG. 4—PRIOR ART, the traditional windowed envelope E has fold lines F, a see-through/clear patch C, and a window W over which the see-through/clear patch C is adhered.

Figure 6:
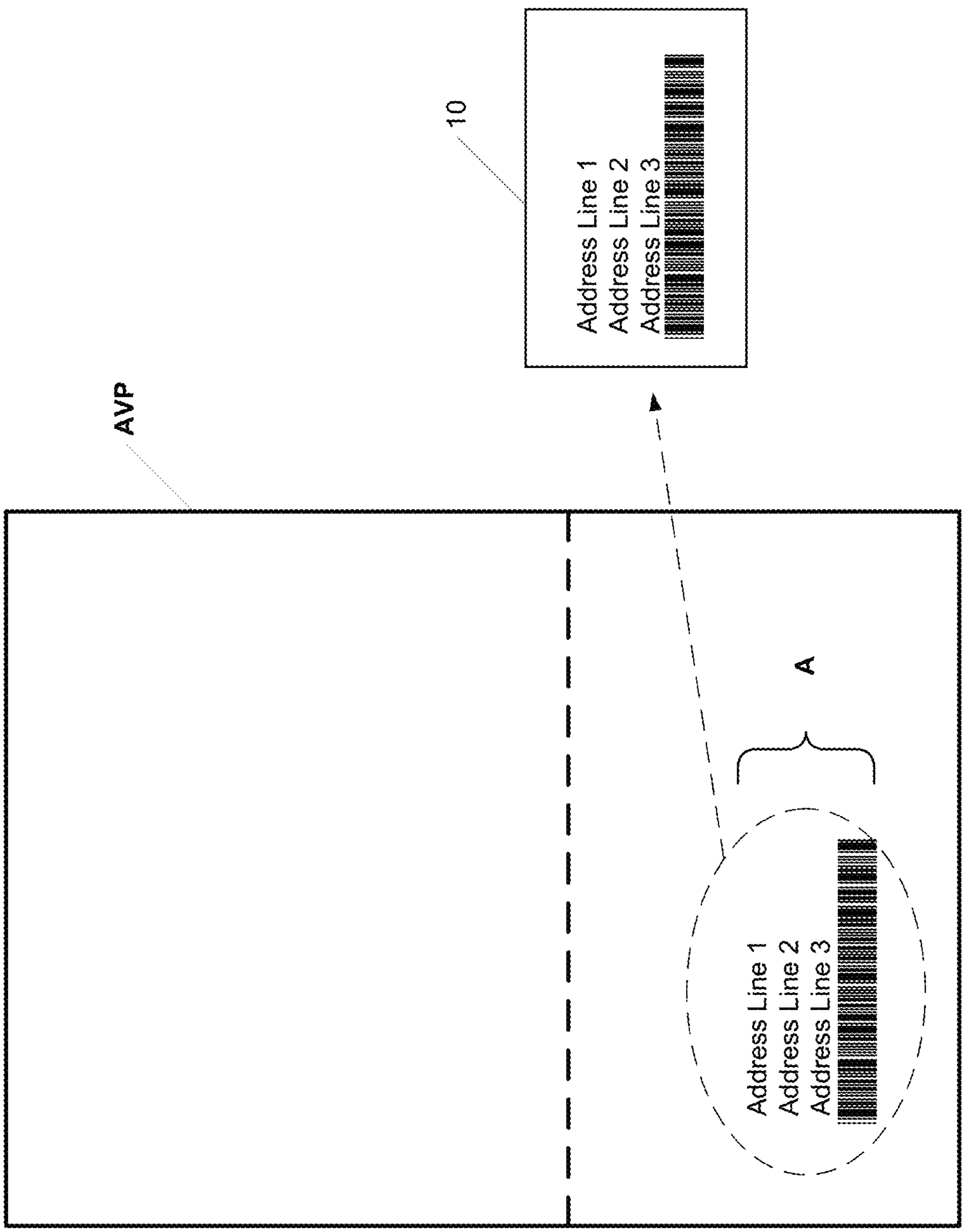
FIG. 6 shows the portion of a typical AVP that is utilized in the subject invention to print on a subject window patch that is adhered inside an envelope and is seen through the envelope's window.

In a real sense (as seen in FIG. 6), the invention produces the same result as would an AVP, except that the only part of the AVP information that goes into the final mailing package is the address portion 10 matching the size and position of a see-through/clear window covering, which saves weight and paper costs.

Since such a window patch is not printed at the same time as the document contained inside the envelope, the subject invention saves not only paper but also high-demand printer capacity, which is freed up for more valuable uses. Additionally, since the windowed envelopes are fabricated with the open window at a reproducible location for any particular envelope size, various sized documents and optional inserts may be placed into the same size-inclusive windowed envelope, thereby enabling one size-inclusive windowed envelope, with particular physical dimensions, to be utilized for many document and insert combinations since the window patch will always be adhered in the correct position. This permits a small set of size-inclusive windowed envelopes, with particular physical dimensions, to be used for a huge array of internal documents/inserts since each member of the set will always have the window patch correctly placed within the window.

Since service providers often use the same forms, artwork, and imagery across a wide variety of document types, a single version of such an apparently-open, but actually-closed window-type envelope can serve to carry a wide variety of document types inside and still be recognized by recipients just as effectively as if the documents were sent inside traditional windowed envelopes.

The subject patch material (normally a paper or other polymer product) produced to serve in place of the traditional see-through/clear window covering would carry not only the service provider's pre-printed artwork and insignia, but also a series of small bar codes carrying an incrementing serial number that can serve as a unique identifier for the envelope to which the material will be attached.

Figure 7:
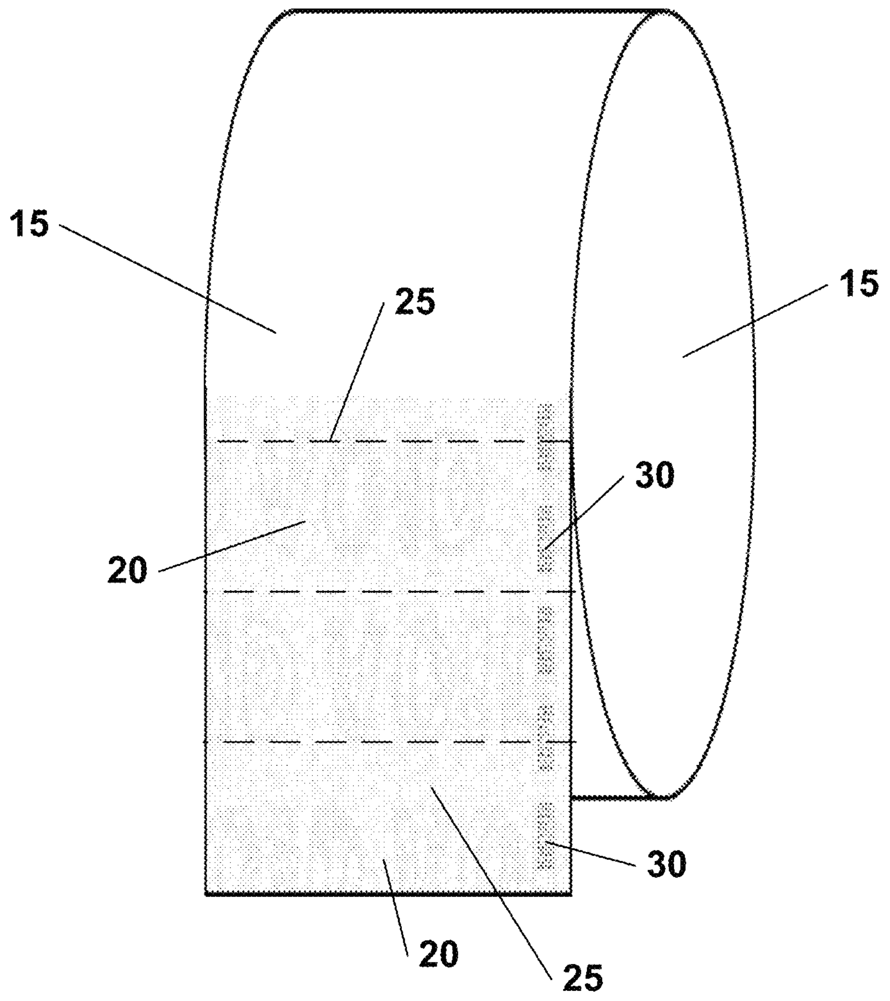
FIG. 7 shows a roll of pre-printed material that is produced to serve as envelope window patches in the subject invention.

As seen in FIG. 7, a roll of pre-printed patch material 15 has individual window patches 20, with any required background printing, that will be cut along the dashed lines 25 to produce the separated patches that are adhered inside each windowed envelope. The serialized unique identifiers 30 (usually any barcode notation) are seen on the right side of each patch 20, but may be printed in any desired location on the patch that does not interfere with the future addresses. The bar code symbols (unique identifiers 30), each representing a unique serial number, are either spaced closely together to ensure that one will always be visible through the window in its entirety, if the envelope production process cannot synchronize patch attachment, or spaced one per patch if the envelope production process can synchronize patch attachment. This ensures that each envelope will always bear a unique machine-readable ID regardless of whether the material is or is not vertically aligned with the envelope's window during the envelope manufacturing process.

Figure 8:
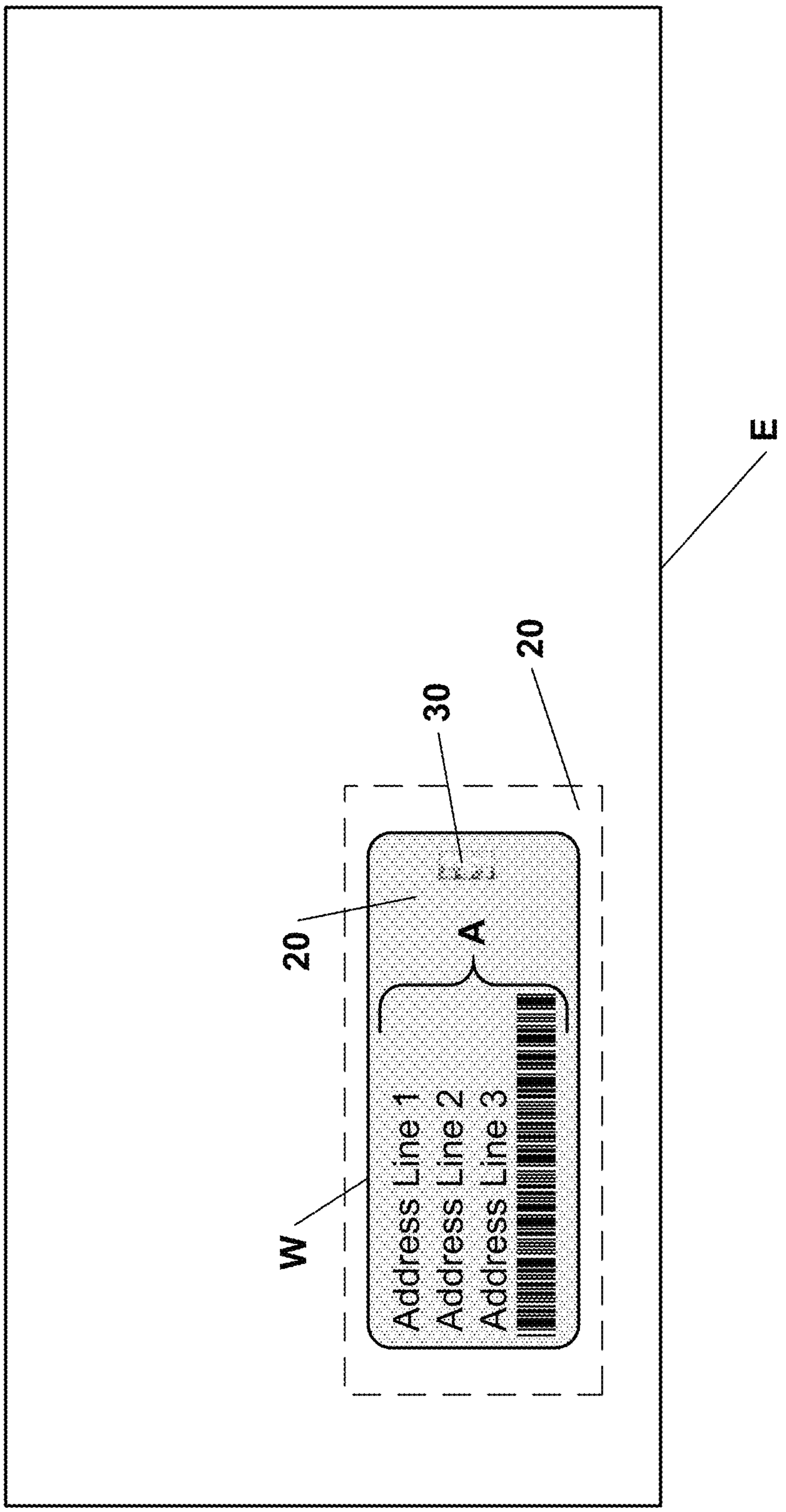
FIG. 8 shows an envelope that employs the subject invention in which an addressed and serialized window patch is adhered to the inside of a windowed envelope and shows through the window.

As seen in FIG. 8, the result is a send envelope with a pre-printed address carrier window bearing a machine-readable serial number on the attached patch that uniquely identifies the envelope. No document information is visible through the envelope window.

Figure 9:
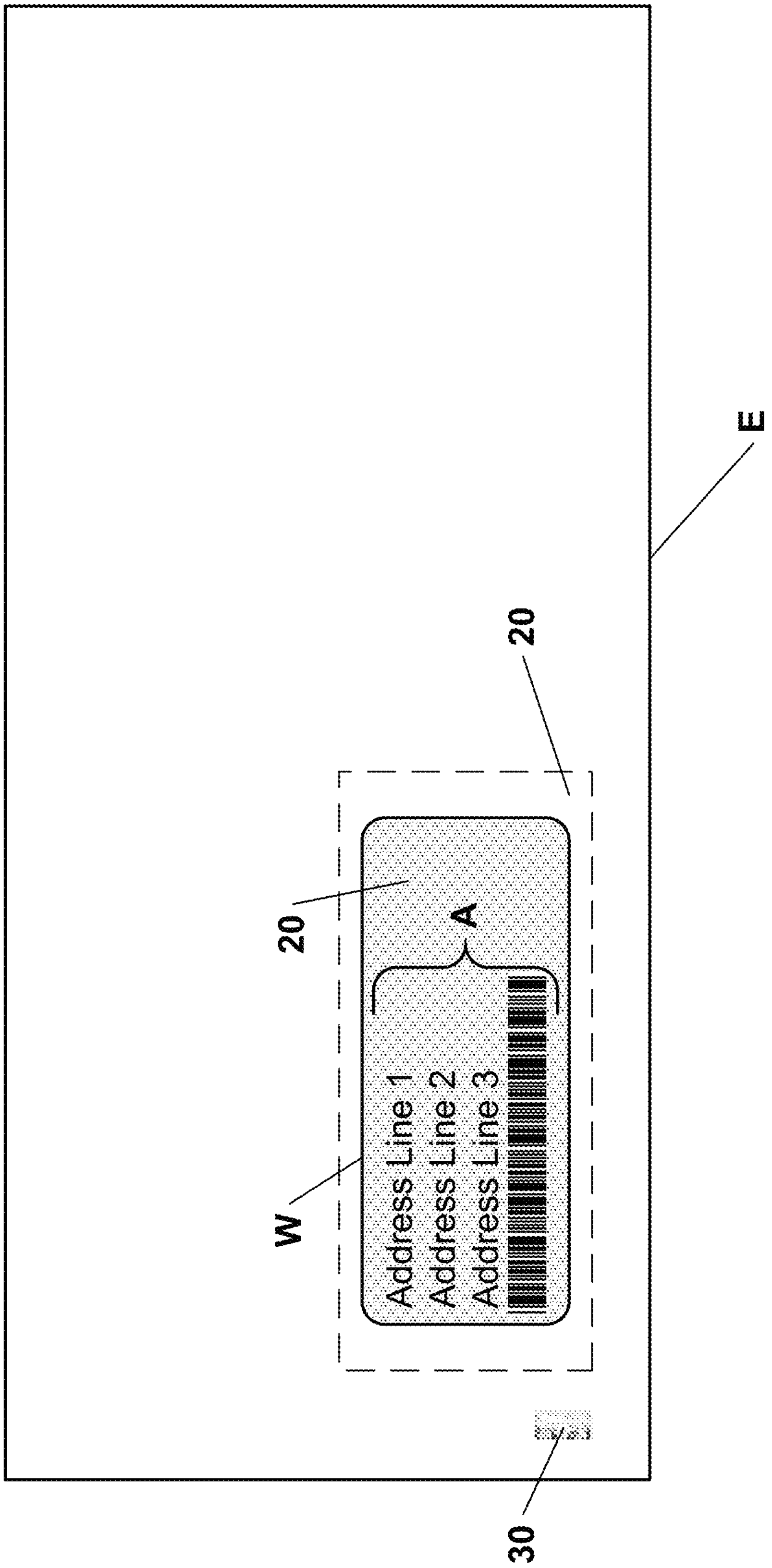
FIG. 9 shows an envelope that employs the subject invention in which an addressed window patch is adhered to the inside of a windowed and serialized envelope and shows through the window.
Figure 10:
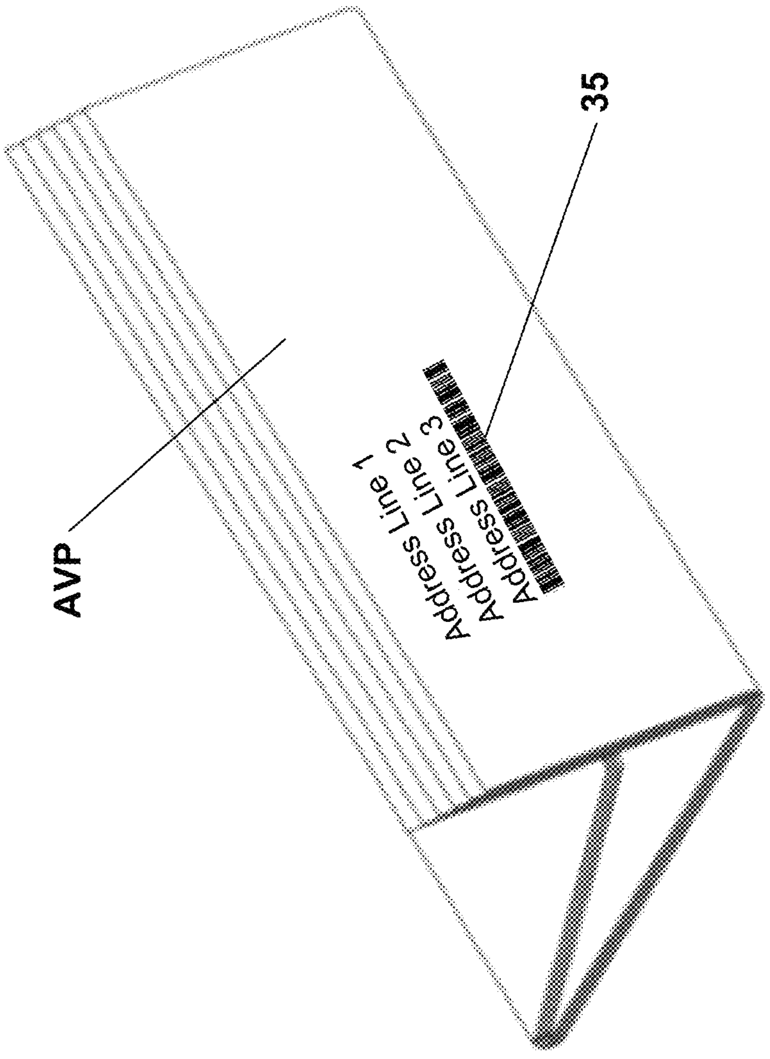
FIG. 10 show a folded set of document pages in which a unique ID is included in the address region so that the window patch address and the document address can be checked for proper correlation.

Alternately, as seen in FIG. 9, the envelopes themselves could be manufactured without the unique ID appearing in the window; but instead the unique ID (barcode 30) could be applied directly to the envelope as it is drawn into an inserting machine. This alternate process would have the advantage of leaving the window area free for address information alone. Such ID application could be done using a small ink-jet printer positioned where the send envelopes are singulated exiting a receiving hopper.

At the inserting machine, when a particular document is being loaded into a particular envelope, a computer controlling two machine vision/imaging components records the unique identity of the envelope and the unique identity of the document going inside it (see FIG. 10 and the associated unique identifier 35, usually a barcode or the equivalent) and then correlates the two, storing the result in a database.

At the end of the inserting machine another machine vision/imaging system controlled by the correlating computer reads the unique ID visible through the envelope's window and, as long as the now-sealed package is in all other respects ready for mailing, looks up the send address in a database using the correlation obtained earlier and prints the send address and an additional bar coded ID directly onto the window material. The additional bar code uniquely correlates the printed send address information with the document inside. The send address is printed using technology that is identical to or similar to the standard printing technology used to print the envelope's contents that the result is not easily distinguishable from a traditional windowed mail piece.

Those skilled in the relevant arts will recognize that modern inserting machinery could, in theory, simply track the mail piece from the point of insertion to the point of send address application and print the corresponding address and bar code without reading any unique ID from the envelope. However, it is well known that machine stoppage and operator manual error recovery events are extremely common in such situations. Since the matching of the send address to the document inside is critically important to both the mailer and the recipient a higher level of assurance is necessary. The invention provides such assurance without the need to open or peer inside the envelope. For example, if, instead, the correlating computer, upon reading the unique serialized ID, visible either on the envelope or through the envelope's window, found that the package was not the one expected or for some reason not ready for mailing, perhaps because of a processing error having been detected earlier, the controlling computer would prevent the correlating address from being printed on the window material, and instead an error message such as "Processing Error DO NOT MAIL" would be printed instead. Such a message would effectively prevent the document from ever reaching any recipient, even if the mail processor for whatever reason failed to stop its departure from the mailing facility.

Additionally, after the address is applied to the window patch, the invention provides that yet another machine vision/imaging system can record the final image of the completed mail piece's face, which would then include the serialized bar code symbol, the printed address, and the unique correlation barcode symbol, and verify all with the images recorded at the time the document and the envelope first came together immediately prior to the main inserting section of the machine. Such verification serves as a check on the address printing component of the system.

Together the system of overlapping automated process quality assurances prevents errors by any single component of the system from allowing bad mail pieces to exit the mailing facility.

Figure 11:
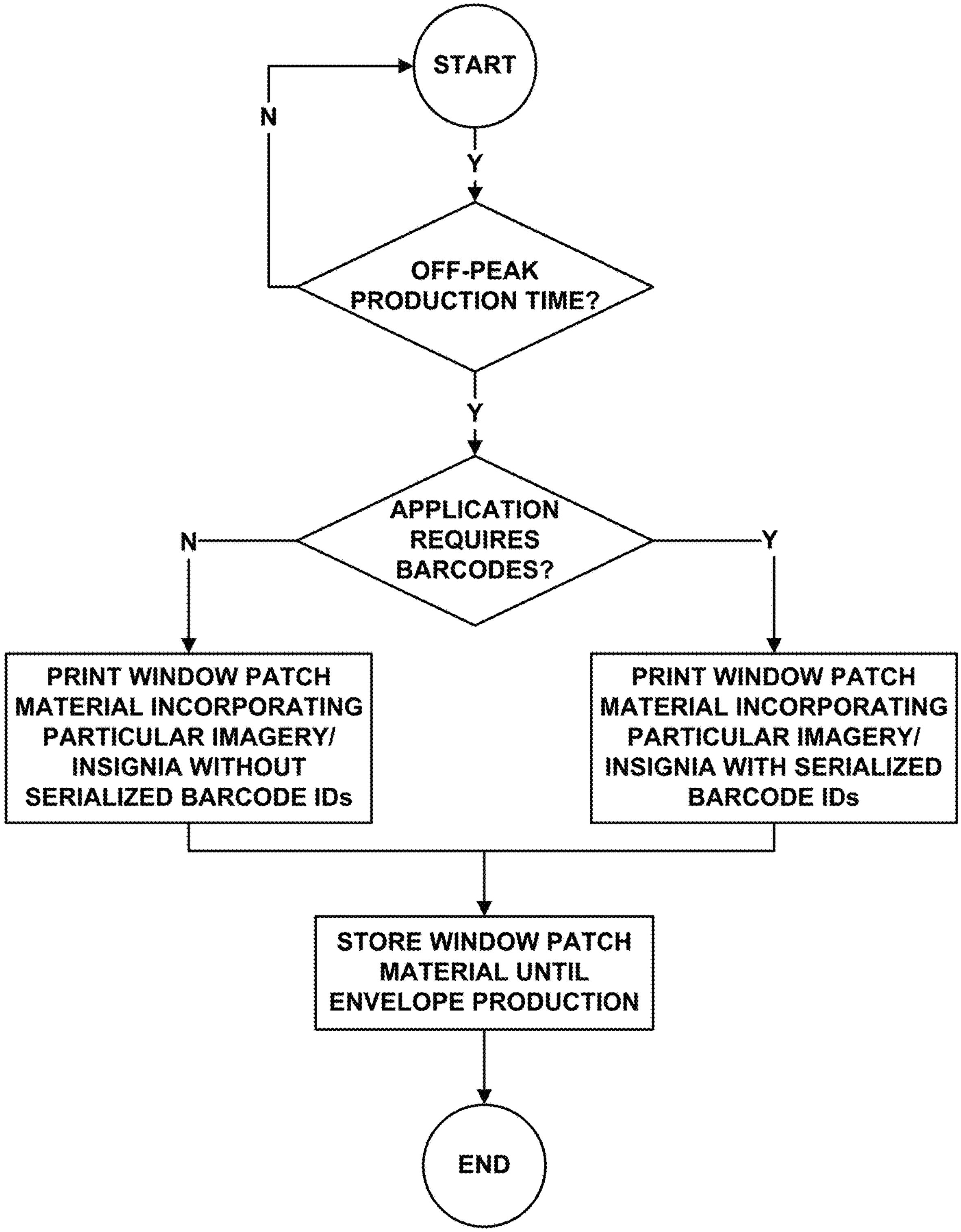
FIG. 11 is a flow chart showing the production of subject window patch material (see FIG. 7, above).

FIG. 11 illustrates an exemplary flow chart that describes the process of producing the patch material for the subject invention.

Figure 12:
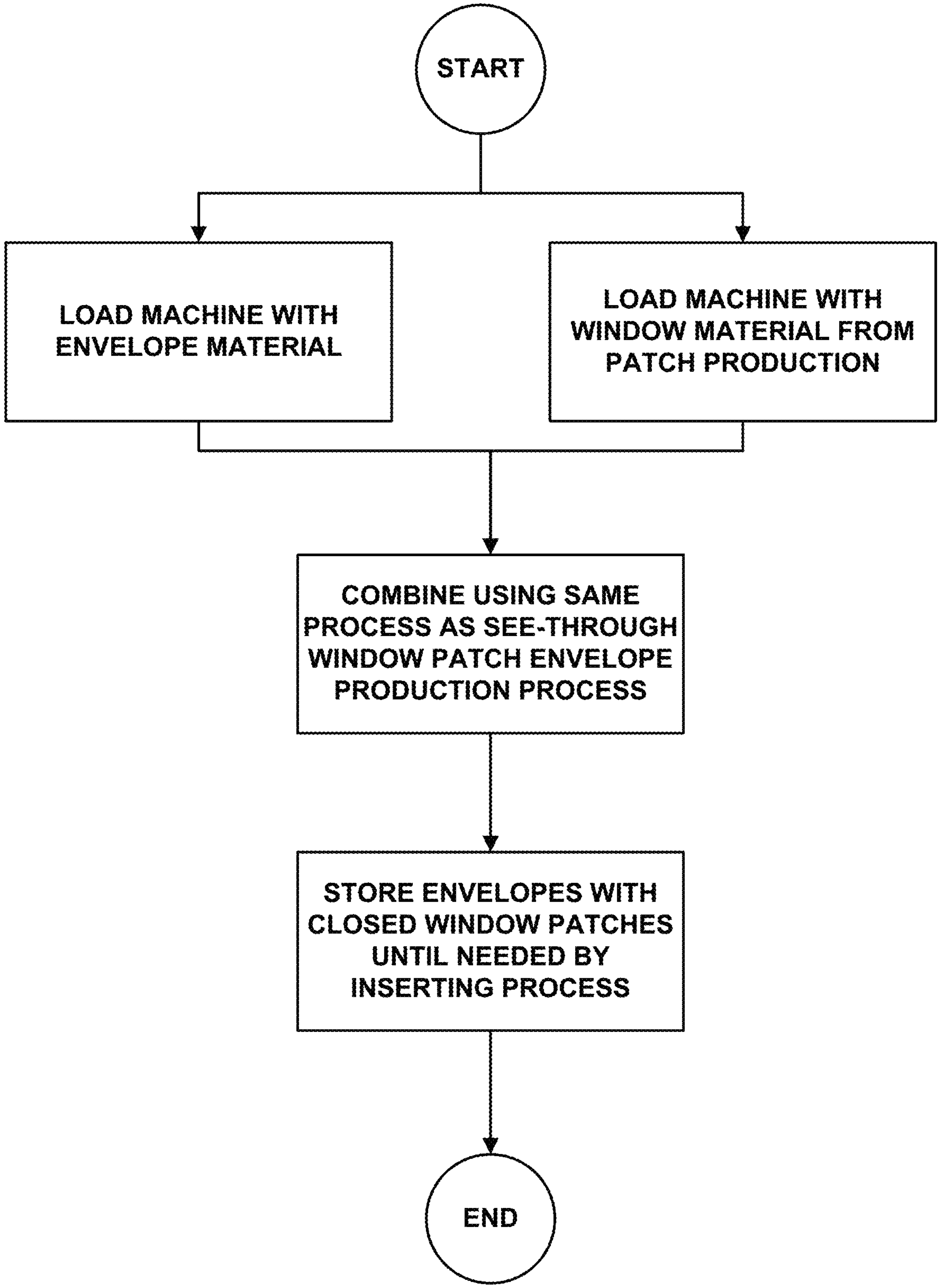
FIG. 12 is a flow chart showing the process for how a subject window patch is adhered to the inside of a windowed envelope.

FIG. 12 illustrates an exemplary flow chart that describes the process of producing the window-adhered address patch for the subject invention.

Figure 13A:
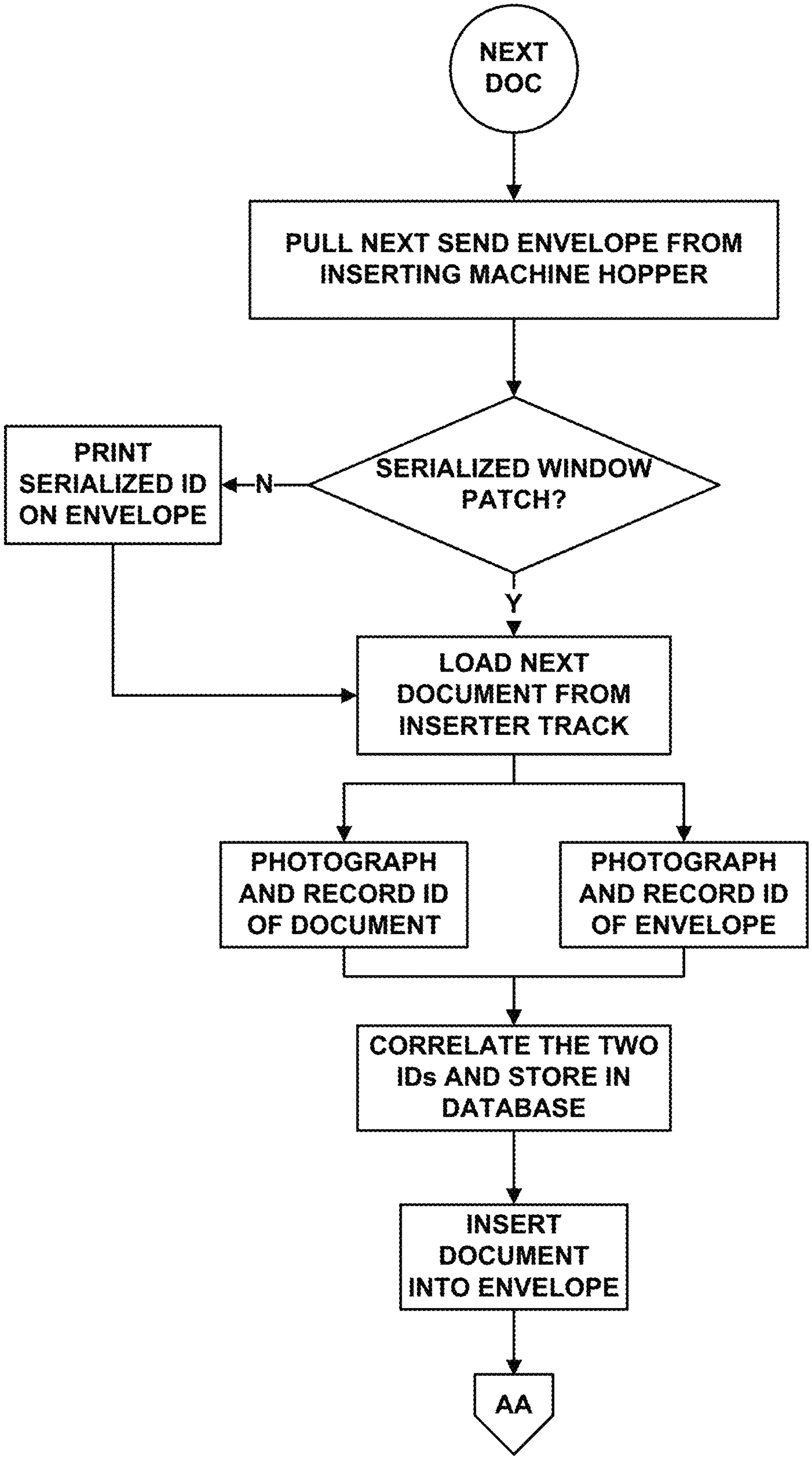
FIG. 13A shows a flow chart dealing with the correlation and insertion process of the subject invention.

FIG. 13A illustrates an exemplary flow chart that describes the subject correlation and insertion process for the subject invention.

Figure 13B:
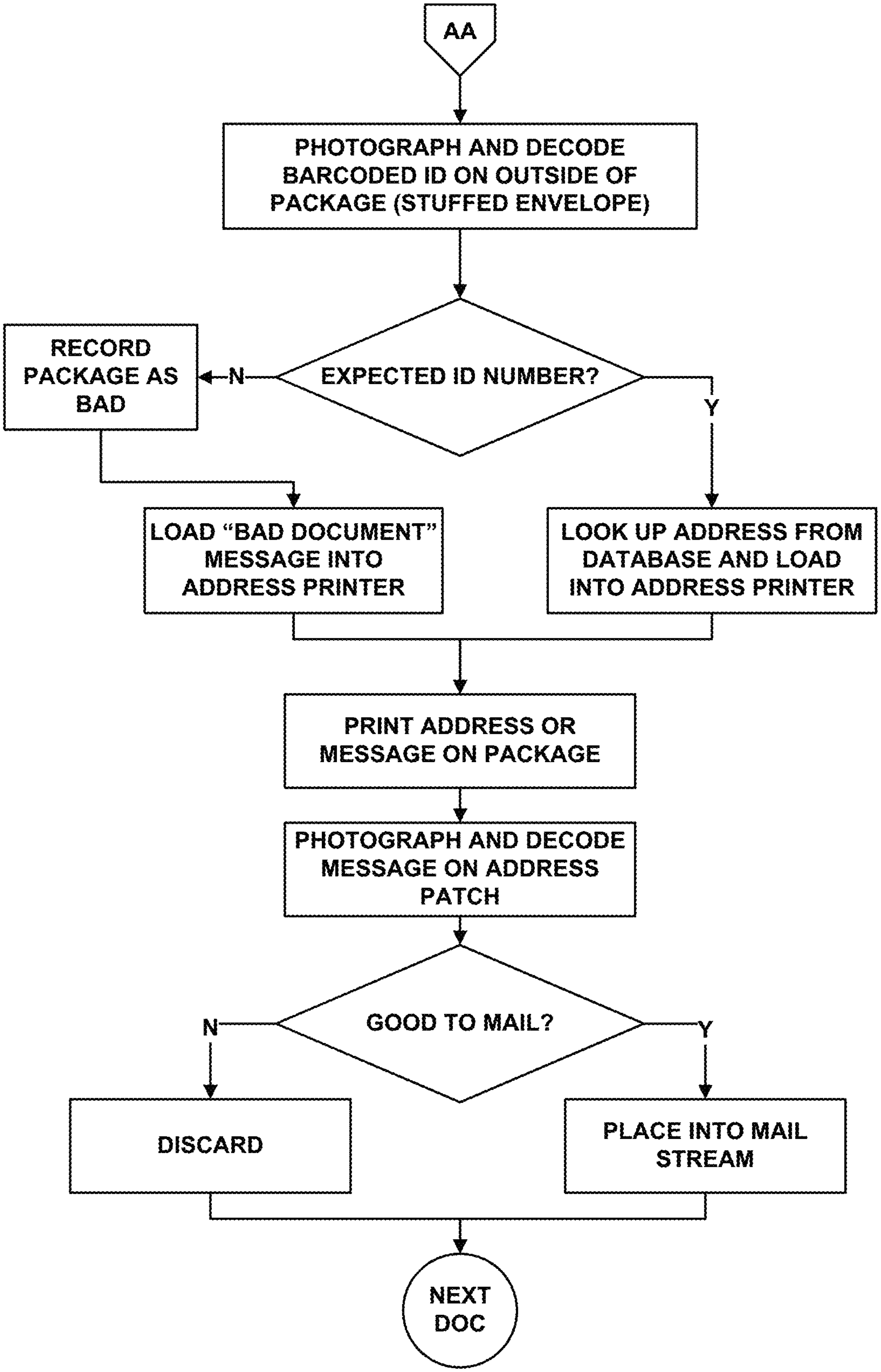
FIG. 13B shows a flow chart dealing with the addressing and verification process of the subject invention.

FIG. 13B illustrates an exemplary flow chart that describes the subject addressing and verification process for the subject invention.

Additionally, the subject invention may comprise a postal authority-compliant mail piece, wherein the window patch is printed either before or after adherence to the inside of the envelope, as desired by the mailing facility. Clearly, the flow diagram seen in FIG. 13B is slightly altered (to eliminate the patch printing step) in a situation in which the window patch is printed before adherence.

Further, although the envelope-contained document is often a bill, statement, or the like, additional informational material may be contained in the envelope such as advertisements and the like.

It is noted that the window patch or envelope may be printed with messaging information that is additional to said address information.

There are many advantages for the subject invention over the existing system. The subject invention provides a means for a number of efficiencies to be enjoyed by mailers while still presenting recipients with the traditional look and feel of a transactional mail piece in a windowed envelope, including, but not limited to:

1) It saves production cost and postage for additional sheet (a.k.a. Address Vehicle Page);

2) A single envelope size can suit a range of document sizes since it does not matter if packages move around inside;

3) It supports the personalization of each envelope because printing technology can place images on the envelope as well as on the window;

4) It requires a personalization print path requirement of only about 4.2 inches across the front of the envelope allowing half-letter size print heads to handle any document;

5) It supports increased job consolidation by removing address and window placements as barriers;

6) It supports electronic sorting of documents with different send address locations to achieve higher postage discounts;

7) It adds little or no weight to mail piece compared to see-through window envelopes;

8) It saves unit envelope cost due to fewer envelope variations and larger order quantities;

9) Each envelope is more environmentally friendly because each transparent plastic window covering is replaced with more recyclable paper;

10) More secure envelopes eliminate the possibility of PII showing through the window; and 11) It can free up valuable space on the document now used by the sending address and window clear zones.

Disclosed embodiments of the subject invention include a postal authority-compliant and document size-inclusive envelope for containing one or more documents having address information and of one or more pages, with each document of fixed or variable sizes, in which document information is protected from outside-the-envelope viewing, comprising: a) the document size-inclusive mailing envelope having a cutout window and dimensioned to accept one or more variably sized documents; b) an opaque address window patch for printing address information associated with the document that is mailed in the mailing envelope, wherein the address widow patch is adhered inside the mailing envelope over the window and visible through the window, thereby protecting document information from view through said cutout window; and c) a unique identifier printed on either the address window patch or a front of the document size-inclusive mailing envelope, wherein said unique identifier correlates with the document address information.

Additionally, disclosed embodiments of the subject invention include a postal authority-compliant mail piece, comprising: a) a document size-inclusive mailing envelope having a cutout window, wherein the envelope contains one of more documents of one or more pages, with each document of fixed or variable sizes, in which document information is protected from outside-the-envelope viewing; b) a document having address information for a recipient contained within the windowed envelope; and c) a window patch printed with the address information obtained from the document and adhered inside the envelope over the window and visible through the window, thereby protecting information printed on the document form viewing through the window.

An additional embodiment includes a barcode on the window patch to uniquely identify the envelope.

Another embodiment includes a process that matches the window patch barcode with a unique identifier on the document.

A further embodiment includes a process that ensures that the address information on the document is printed on the window patch.

Yet another embodiment includes a process that ensures that the address information printed on the window patch can be verified any time after being produced without opening the envelope.

Still another embodiment includes a process that ensures the verification without opening the envelope occurs by matching the document identifier with the window patch barcode to establish both are the same.

An additional embodiment includes a barcode on the envelope to uniquely identify the envelope.

Still an additional embodiment includes a process that matches the envelope barcode with a unique identifier on the document.

Yet still another embodiment includes a process that ensures that the address information on the document is printed on the envelope.

A further additional embodiment includes a process that matches the envelope barcode with a unique identifier on the document.

Still another further embodiment includes a process that ensures the verification without opening the envelope occurs by matching the associated unique ID printed at the same time as the address with the serialized envelope barcode to establish that the correct address was printed.

Another additional embodiment comprises the document or documents being printed at a first time and the window patch printed at a second time.

Another embodiment of the subject invention includes a mail piece assembly system for creating a postal authority-compliant transactional mail piece that has a document size-inclusive and windowed envelope for containing one or more documents of one or more pages, with each document of fixed of variable sizes, and optional inserts, with an internal adhered address patch that is visible through the window, thereby protecting information on the document from viewing through the window, and the one or more internal addressed documents, comprising: a) means for producing window patch material for adhering over the window inside the document size-inclusive envelope; b) means for producing the window-adhered address patch from the window patch material; c) means for applying a unique identifier to either the document size-inclusive envelope or the address patch; d) means for correlating document address information with either the address window patch or the document size-inclusive envelope unique identifiers; e) means for inserting the one or more documents into the document size-inclusive envelope; f) means for printing the address patch with the document address information; and g) means for verifying that the document address information matches the printed patch or document size-inclusive envelope identifiers.

Still yet another embodiment of the subject comprises a method for creating a postal authority-compliant transactional mail piece for mailing to a recipient at one address that contains one or more single and multipage documents, with optional fliers, and is contained within a windowed envelope The steps comprise: a) selecting a windowed envelope that is sufficiently sized to contain all of the one or more single and multipage documents, with optional fliers, being mailed to one address; b) producing an address window patch, printed with document address information, for internal adherence over a window in the envelope so as to be visible through the window, thereby protecting information on the enclosed one or more documents from viewing through the window; c) applying a unique identifier to either the windowed envelope or the address window patch; d) adhering the address window patch over the window inside the windowed envelope; e) inserting the one or more single and multipage documents, with optional fliers, into the windowed envelope; f) correlating the document address information with either the windowed envelope or the address window patch unique identifiers; and g) verifying that the document address information matches the printed address window patch or windowed envelope indentifiers.

Embodiments of the subject technology may be described with reference to flowchart illustrations of methods and systems according to embodiments of the technology, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

It will further be appreciated that the terms "programming" or "program executable" as used herein refer to one or more instructions that can be executed by a processor to perform a function as described herein. The instructions can be embodied in software, in firmware, or in a combination of software and firmware. The instructions can be stored locally to the device in non-transitory media, or can be stored remotely such as on a server, or all or a portion of the instructions can be stored locally and remotely. Instructions stored remotely can be downloaded (pushed) to the device by user initiation, or automatically based on one or more factors. It will further be appreciated that as used herein, that the terms processor, computer processor, central processing unit (CPU), and computer are used synonymously to denote a device capable of executing the instructions and communicating with input/output interfaces and/or peripheral devices.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A postal authority-compliant and document size-inclusive envelope for containing one or more documents having address information and one or more pages, with each document of fixed or variable sizes, in which document information is protected from outside-the-envelope viewing, comprising:

i) the document size-inclusive mailing envelope having a cutout window and dimensioned to accept one or more variably sized documents; and ii) an opaque address window patch printed with the address information associated with the one or more documents, wherein the widow patch is adhered inside the mailing envelope over the window before being printed with the address information.

2. A postal authority-compliant mail piece, comprising:

i) a document mailing envelope having a cutout window, wherein the document mailing envelope protects document information therein from outside-the-envelope viewing;

ii) a document having associated address information for a recipient contained within the windowed envelope; and iii) an opaque address window patch printed with the address information associated with the one or more documents, wherein the widow patch is adhered inside the mailing envelope over the window before being printed with the address information.

3. The postal authority-compliant mail piece according to claim 2, further comprising a barcode on the window patch to uniquely identify the envelope.

4. The postal authority-compliant mail piece according to claim 3, wherein the postal authority-compliant mail piece is further configured to allow for matching the window patch barcode with a unique identifier on the document.

5. The postal authority-compliant mail piece according to claim 4, further comprising a process that ensures that the address information on the document is printed on the window patch.

6. The postal authority-compliant mail piece according to claim 5, further comprising a process that ensures that the address information printed on the window patch can be verified any time after being produced without opening the envelope.

7. The postal authority-compliant mail piece according to claim 6, further comprising a process that ensures the verification without opening the envelope occurs by matching the associated unique ID that is printed at the same time as the address with the serialized envelope bar code to establish that a correct address was printed.

8. The postal authority-compliant mail piece according to claim 2, further comprising a barcode on the envelope to uniquely identify the envelope.

9. The postal authority-compliant mail piece according to claim 8, further comprising a process that matches the envelope barcode with a unique identifier on the document.

10. The postal authority-compliant mail piece according to claim 9, further comprising a process that ensures that the address information on the document is printed on the envelope.

11. The postal authority-compliant mail piece according to claim 10, further comprising a process that matches the envelope barcode with a unique identifier on the document.

12. The postal authority-compliant mail piece according to claim 11, further comprising a process that ensures the verification without opening the envelope occurs by matching the associated unique ID that is printed at the same time as the address with the serialized envelope bar code to establish that a correct address was printed.

13. The postal authority-compliant mail piece according to claim 2, wherein the window patch is printed after adherence to the inside of the envelope.

14. The postal authority-compliant mail piece according to claim 2, wherein the window patch is printed before adherence to the inside of the envelope.

15. The postal authority-compliant mail piece according to claim 2, further comprising messaging information that is additional to the address information.

16. The postal authority-compliant mail piece according to claim 2, further comprising the document printed at a first time and the window patch printed at a second time.

17. A mail piece assembly system comprising at least one device configured to perform at least:

i) producing an internal window adhered address patch from the address window patch material for adhering over a window inside a document envelope;

ii) applying the internal window adhered address patch over the window inside the document envelope;

iii) correlating document address information with either the internal window adhered address patch or the document size-inclusive envelope unique identifiers;

iv) inserting the one or more documents into the document size-inclusive envelope;

v) printing the internal window adhered address patch with the document address information.

18. A method for creating a postal authority-compliant transactional mail piece comprising:

i) producing an internal window adhered address patch from the address window patch material for adhering over a window inside a document envelope;

ii) applying the internal window adhered address patch over the window inside the document envelope;

iii) correlating document address information with either the internal window adhered address patch or the document size-inclusive envelope unique identifiers;

iv) inserting the one or more documents into the document size-inclusive envelope;

v) printing the internal window adhered address patch with the document address information.

* * * * *